(12) United States Patent
    Chan (10) Patent No.: US 11,086,118 B2
(45) Date of Patent: Aug. 10, 2021

(54) SELF-CALIBRATING AND DIRECTIONAL FOCUSING SYSTEMS AND METHODS FOR INFINITY CORRECTED MICROSCOPES

(71) Applicant: Molecular Devices, LLC, San Jose, CA (US)

(72) Inventor: Matthew Chan, Palo Alto, CA (US)

(73) Assignee: Molecular Devices, LLC, San Jose, CA (US)

( * ) Notice: Subject to any disclaimer, the term of this patent is extended or adjusted under 35 U.S.C. 154(b) by 176 days.

(21) Appl. No.: 16/397,665

(22) Filed: Apr. 29, 2019

(65) Prior Publication Data

US 2020/0341255 A1 Oct. 29, 2020

(51) Int. Cl.
  *G02B 21/24* (2006.01)
  *G02B 7/09* (2021.01)

(52) U.S. Cl.
  CPC ............. *G02B 21/245* (2013.01); *G02B 7/09* (2013.01)

(58) Field of Classification Search
  CPC ......... G02B 21/245; G02B 7/09; G02B 21/00
  See application file for complete search history.

(56) References Cited

U.S. PATENT DOCUMENTS

| | | | | |
|---|---|---|---|---|
| 6,172,349 B1* | 1/2001 | Katz | ................... | G02B 21/244 |
| | | | | 250/201.3 |
| 7,660,696 B1* | 2/2010 | Norton | ................. | G01N 21/956 |
| | | | | 702/151 |
| 7,700,903 B2 | 4/2010 | Weiss et al. | | |
| 2005/0006598 A1* | 1/2005 | Pearl | ..................... | H01J 37/265 |
| | | | | 250/492.1 |
| 2011/0317260 A1* | 12/2011 | Krueger | ............... | G02B 21/241 |
| | | | | 359/383 |
| 2013/0329233 A1* | 12/2013 | Cohen | .................. | G02B 21/006 |
| | | | | 356/624 |
| 2017/0199367 A1* | 7/2017 | Muller | ................... | G02B 21/02 |

* cited by examiner

*Primary Examiner* — Thanh Luu
*Assistant Examiner* — Monica T Taba
(74) *Attorney, Agent, or Firm* — McCracken & Gillen LLC

(57) ABSTRACT

Systems and methods for autofocusing an objective lens in a microscope system. A self-calibrating autofocus system includes a light source, a decentered aperture, and image-capturing device. The system may be connected to the microscope system so that the light source generates a light on an optical path that includes the objective lens and a plate having a reference surface proximal to a sample holding component. The image capturing device images a reflection of light from the reference surface as the objective lens moves to a series of z-positions. A reference calibration slope is generated for the objective lens by determining positions of the images taken at the z-positions of the objective lens. At least one image having a particular attribute corresponds to a best focus position. The objective lens is moved to predicted best focus or preferred offset from calibrated best focus using the reference calibration slope.

21 Claims, 10 Drawing Sheets

SELF-CALIBRATING AND DIRECTIONAL FOCUSING SYSTEMS AND METHODS FOR INFINITY CORRECTED MICROSCOPES

FIELD OF DISCLOSURE

The present subject matter relates to systems and methods for focusing microscopes, and more particularly, to systems and methods for calibrating a best focus position to autofocus an objective lens of microscopes.

BACKGROUND

Microscopes have evolved from standalone arrangements of optics that allow a user to view an image from individual slides, to high-throughput imaging systems that generate images of samples deposited in multiple sample wells formed in trays or plates (also known as "microwells," "microtiter," and "microplate"). The optics in microscope systems may be controlled by electromechanical devices under computer program control. Images may be collected using image capturing devices such as for example, cameras, charge-coupled device or other image capture devices.

Modern microscope systems may be used for detecting and measuring optical signal characteristics. In some systems, the sample wells may contain material, such as biological material, for example, that has been treated with a marker or a reactive component that causes an emission of light. The microscope may be used to detect intensity levels and patterns of light as opposed to simply capturing an image. As such, the microscope may use signal detector devices as well as image-capturing devices to obtain measurements of light levels. The detection component of the microscope may thus include, for example, photomultiplier tubes, photodetectors, and photodetector arrays, in addition to image capturing devices. Microscope systems may also provide alternative illumination systems, such as, for example, coherent (laser) or non-coherent light sources, or light sources filtered at selected wavelengths. Filters, beam splitters and other optical devices may be inserted at various places in the optical path between the light source and the sample, or between the sample and the detection component to either excite the sample in a desired manner, or to measure selected optical characteristics including intensities at certain wavelengths and other characteristics.

In capturing or discerning patterns in images, or in measuring optical signals, optical devices, such as, lenses, mirrors, filters, etc., are disposed along an optical path from the light source to the image capturing device. An imaging lens is adjusted to focus the light source on an image plane of the image capturing device when the objective lens is in focus on the reference surface. A lack of focus appears in images as a blurring or fuzziness. Similarly, optical measurements taken from an unfocused objective may not yield accurate intensity levels and pixels that may be brighter or less bright than they are supposed to be due to the spreading of the image when de-focused. The objective lens should typically be positioned to focus on the sample before imaging or optical measurements are performed by a microscope system.

In high-throughput microscope systems, where a microscope may be used to capture images or optical signal measurements of a large number of samples, the focusing step may need to be performed many times as quickly as possible. The focusing process should also be sensitive and accurate while adding as little complexity as possible, and without perturbing the sample. The focusing process should also be an autofocusing process, or a process that is performed with as little involvement by the user as possible. Fluorescence microscopes are used in analyzing biological samples tagged with one or more fluorophores. It is important to avoid causing photo damage to the fluorophore and the biological sample.

Microscope systems typically perform a hardware-based autofocus for each sample being processed. In a high-throughput microscope system, sample wells supported on a plate have a sample well bottom surface and a plate bottom surface. The sample well bottom surface and the plate bottom surface are at least partially reflective. In one approach to a hardware-based autofocus system, a sample well is illuminated through an objective lens that is to be used in the imaging or the optical measurements to be performed on the sample in the sample well. The objective lens is positioned at a series of positions along the optical axis along which the objective lens travels while an image and pixel intensity is checked at each position. The optical axis along which the objective lens travels may be referred to as a z-axis and the motion of the objective lens may be referred to as a scan along a z-axis.

Figure 1A:
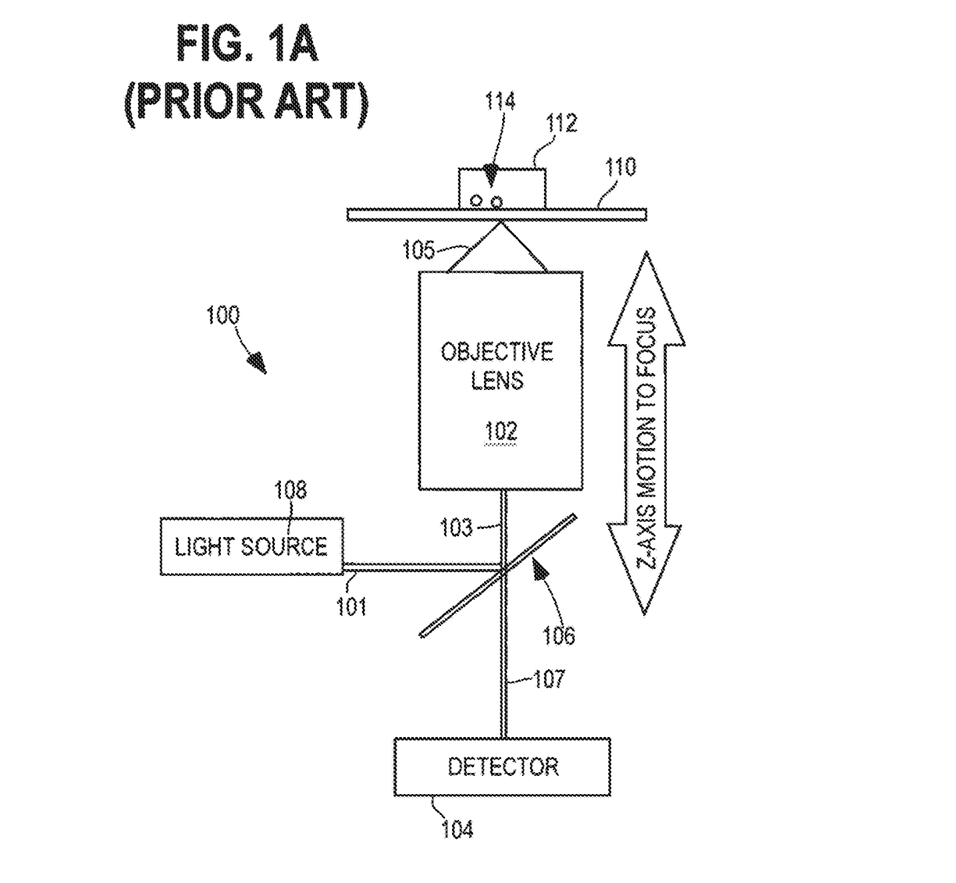
FIG. 1A is an example of a known microscope system configured to perform a hardware or image-based autofocusing procedure.

FIG. 1A is a schematic diagram of a microscope 100 illustrating operation of a process for performing a hardware-based autofocus of the microscope 100 for imaging on a sample 114 in a sample well 112 disposed on a plate 110. The microscope 100 in FIG. 1A includes main components for autofocus: an objective lens 102, a detector 104, a beam splitter 106, and a light source 108. The microscope 100 may be implemented in a system that includes components configured to control the state and the motion of the objective lens 102 and the plate 110. Such components may also be configured to control the state of the light source 108 and operation of the detector 104. For example, the movement of the objective lens 102 along a z-axis may be controlled using a linear actuator having an electric motor under control of a computer program. The objective lens 102 is moved to positions (i.e. z-positions) on the z-axis. The detector 104 may be implemented as a charge-coupled device or other image capturing device also controlled to capture an image and to transfer the digital content of the image to a computer by a computer program.

In an example hardware-based autofocusing process, a user may be provided with a user interface for entering configuration data to configure the microscope according to a type of objective lens 102, type of plate 110, and light source 108. The system may then position the objective lens 102 at a starting location on the z-axis in a suitable proximity to the plate 110. The starting position may depend on the type of plate 110 as different plates may have a plate bottom surface at different positions along the z-axis. The objective lens 102 may also be controlled to move along a working distance, or a scan range, through which a best focus position can be found. The process typically involves positioning the objective lens 102 at each z-position in the scan range and capturing an image at each z-position.

The light from the light source 108 follows a first optical path at 101 from the light source 108 to the beam splitter 106. The beam splitter 106 reflects part of the light towards the objective lens 102, which directs the light along optical path 105 towards the sample well 112. The light reflects off the top and/or bottom surfaces of the plate 110 back towards the objective lens 102 and through the beam splitter 106 along optical path 107 to the detector 104. If the position of the objective lens 102 is sufficiently close to a position at which the objective lens 102 focuses on a reflective surface of the plate 110, the light appears at the detector 104 as a beam spot having a diameter and an intensity. As the objective lens 102 is moved along the z-axis, the system controls the detector 104 to capture an image at each z-axis position. Each image is analyzed to determine a focus score based on a focus metric that may include for example, average intensity, a maximum signal, standard deviation, variance, or covariance, size, morphology, position, and others, of the pixels in each spot. The smallest and brightest spot is typically deemed to have the "best focus." The focus score may be plotted against the z-position at which each image is captured in a graph 120. In the graph 120 (see FIG. 1B), the smallest and brightest spots might form a peak at 124 for its intensity and z-position values. The graph 120 may also indicate the brightest pixels as peaks 122 and 126. The z-position at the highest focus score (at 124 in FIG. 1B) is identified as being the best focus position.

Figure 1B:
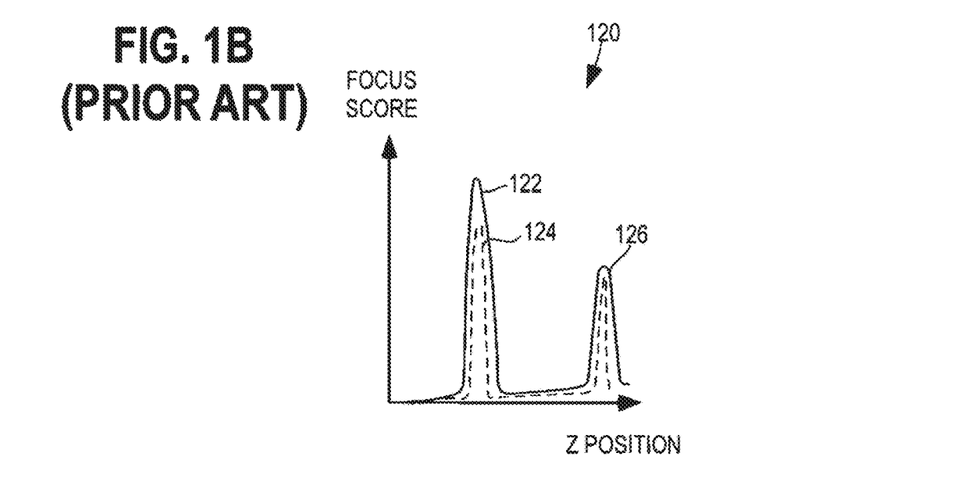
FIG. 1B is an example of a graph of focus scores for intensity measurements of light reflected off two surfaces at a sample well for a scan of z-positions for an objective lens.

It is noted that two peaks may be formed in the graph indicating reflections off the two surfaces on the plate 110. Once the peak or peaks are identified and the corresponding z-position identified for each peak, the process identifies the best focus position as the z-position corresponding to a selected one of the peaks. That is, the best focus position is the position at which the spot formed by the light reflected off either the top or bottom surface of the plate 110 has the best focus score.

The best focus position in the context of the autofocus procedure described with reference to FIG. 1A is the z-position of the objective lens 102 that produces the sharpest and clearest projection of a light beam reflected from a reference surface. In the system shown in FIG. 1A, the reference surface is either the top or bottom surface of the plate 110. In order to image with good focus on the sample (114 in FIG. 1A), such as for example, a collection of cells, the objective lens 102 should be moved to focus on the sample 114. In some implementations, an offset along the z-axis may be defined according to a sample type, the objective lens, a plate type, and/or other suitable parameters. When a best focus position is determined, the objective lens 102 may be moved according to the offset to begin imaging. In some implementations, the system may perform an image-based autofocus after the hardware-based autofocus. An image-based focus involves moving the objective lens 102 along the z-axis while checking actual images of the sample until the sample is in focus.

The autofocus procedure described with reference to FIG. 1A may involve a hardware-based autofocus to find the reference surface on the plate 110 and either a move by an offset to focus on the sample, or an image-based focus to find the sample 114. The hardware-based autofocus or the image-based autofocus, or both, may need to be performed each time a new sample well is presented for imaging even though the objective lens is not replaced. The microplates on which the sample wells are disposed may not be perfectly flat and the thickness of the sample well bottoms may not be consistent. Different samples or different light sources may also call for a re-focus.

Current hardware-based autofocus procedures are slowed by the need to collect data points from each z-position in the working distance of the objective lens 102. In systems in which a microscope is used to image a large number of samples, even a short delay in the focusing of the objective of the microscope may be too long. Other processes that are used come with trade-offs and other limitations, such as complexity, reduced accuracy, sensitivity to the surface reflecting the light bundle imaged during focusing, and high cost.

SUMMARY

According to one aspect, a method is provided to perform a self-calibrating autofocusing procedure for an objective lens in a microscope system. In an example method, a reference calibration slope is generated by determining respective positions of a plurality of images taken at a series of z-positions of the objective lens. The images are analyzed to determine a particular attribute corresponding to a best focus position. An autofocusing procedure may then be performed on the objective lens based at least in part on the reference calibration slope and the best focus position.

In another aspect, the reference calibration slope indicates a linear relationship between the series of objective lens positions and the lateral positions on an image plane as the reference images translate in the image plane.

In another aspect, the reference image may be a beam spot reflected from a reference surface and projected on to an image-capturing device. Alternatively, the reference image may be a patterned image.

In another aspect, a system for autofocus is provided. One example of an autofocus system includes a light source, a decentered aperture, and optical components to form optical paths towards an image capturing device. The autofocus system may be connected to a microscope system with an optical path that includes the objective lens of the microscope system. The autofocus system may also operate as a sub-system of the microscope system. The autofocus system also includes a controller or operate using a controller that operates in the microscope system. The controller may include storage for machine instructions that, when executed by a processor, performs a self-calibrating autofocus method.

BRIEF DESCRIPTION OF THE DRAWINGS

The drawings illustrate the design and utility of embodiments of the disclosed inventions, in which similar elements are referred to by common reference numerals. These drawings are not necessarily drawn to scale. These drawings depict only typical embodiments of the disclosed inventions and are not therefore to be considered limiting of its scope.

DETAILED DESCRIPTION

All numeric values are herein assumed to be modified by the terms "about" or "approximately," whether or not explicitly indicated, wherein the terms "about" and "approximately" generally refer to a range of numbers that one of skill in the art would consider equivalent to the recited value (i.e., having the same function or result). In some instances, the terms "about" and "approximately" may include numbers that are rounded to the nearest significant figure. The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. In describing the depicted embodiments of the disclosed inventions illustrated in the accompanying figures, specific terminology is employed for the sake of clarity and ease of description. However, the disclosure of this patent specification is not intended to be limited to the specific terminology so selected, and it is to be understood that each specific element includes all technical equivalents that operate in a similar manner. It is to be further understood that the various elements and/or features of different illustrative embodiments may be combined with each other and/or substituted for each other wherever possible within the scope of this disclosure and the appended claims.

Various embodiments of the disclosed inventions are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the disclosed inventions, which is defined only by the appended claims and their equivalents. In addition, an illustrated embodiment of the disclosed inventions needs not have all the aspects or advantages shown. For example, an aspect or an advantage described in conjunction with a particular embodiment of the disclosed inventions is not necessarily limited to that embodiment and can be practiced in any other embodiments even if not so illustrated.

Described below are systems and methods for determining a best focus position for an objective lens in a microscope system. The method(s) and system(s) described below disclose a calibration process that generates a reference slope corresponding to various known parameters. Specific to the present inventive concept(s), a decentered aperture is utilized to provide a sampling of the wavefront at a plurality of z positions that is strategically mapped to form a calibration reference slope. This reference slope derived through the calibration process may then be advantageously used to determine an offset from the best focus position, as will be discussed in further detail below. This approach allows the system to rapidly calibrate and return to the best focus during image acquisition, minimizing errors and improving throughput.

As used in the description below, the term "best focus position" shall mean the z-position of the objective lens at which the objective lens provides the best focus on a reference image projected on a reference surface. As such, the best focus position may not be the position at which the objective lens focuses on a sample. The reference surface used to determine the best focus position may be below, or above, the z-position level of the sample when the sample is presented for imaging. In some example implementations and for certain imaging procedures or optical measurement procedures, an offset from best focus position may be defined based on the type of sample being imaged and the objective lens being used for imaging. When more precision is required, a hardware focus may be performed similar to that described above with reference to FIGS. 1A and 1B. The advantage to starting such a hardware-based focus from close proximity to the best focus position is that fewer z-positions are used than with the procedure described above that does not start from a best focus position.

As used in the description below, the terms "imaging," "image capturing," "capture of images," or "detecting an image" shall refer to any process for collecting optical data from an image capturing device. The image may be a reference image for obtaining a reference calibration slope, an image of a sample, including capturing a digital image for storage, or measuring optical characteristics such as, intensity, color, or other types of data.

As used in the description below, the term "sample well" shall refer to any suitable structure for containing a sample to be presented for imaging or for obtaining an optical measurement. The sample well may include for example, a recessed structure formed on a microwell plate as defined below in which a sample may be deposited. The sample well may also include as the term is defined herein a slide with or without a cover or any other suitable structure for containing a sample.

As used in the description below, the term "plate" shall refer to any sample-holding structure configured to support a container in which a sample may be deposited. In particular, the term "plate" may include a tray or similar structure including such sample-holding structures known in the art by terms including "microwells," "consumable," "microtiter," and "microplate". A "plate" shall be understood to refer to a structure capable of holding a single sample well, or a plurality of sample wells. In examples described below, the plate is used to provide a reference surface for determining a best focus position. The term "plate" shall be understood in the description below as meaning any structure that can provide a reference surface for the processes described below unless stated otherwise.

As briefly discussed above, the present invention(as) disclose systems and methods for calibrating a best focus position for an objective lens in a microscope system, and then to use the best focus position calibration to focus the objective lens more quickly and efficiently than with conventional autofocus techniques. When a sample is positioned for measurements using the calibrated objective lens and after the objective lens may have been re-positioned, the best focus position calibration is used to find the position of the objective lens relative to its best focus position. To focus on a sample, the objective lens may be moved to the best focus position or a predetermined offset from best focus.

The calibration of the best focus position for a given objective lens involves determining a relationship between the positions on the axis of travel of the objective lens and a translation of an image (or reference image) on an image plane of an image capturing device. An autofocus subsystem or module in a microscope system may include a suitable light source, a decentered aperture, a reference surface, imaging optics, and an image-capturing device. The reference surface may be a plate (i.e. microplate, microwell plate, microtiter, etc.) that may be used to hold sample wells that contain samples on which optical measurements will be performed. The components may be arranged to illuminate the reference surface with the light source through the objective lens of the microscope system. The optical components project a reference image on the image-capturing device as shown for example in FIGS. 2A and 5-7. The decentered aperture is positioned and sized to sample a portion of the total light through the entrance pupil of the objective to project on the image-capturing device as, for example, a beam spot. As the objective lens is moved along its axis of travel, the beam spot translates linearly and changes focus. This pattern is strategically utilized to create a reference slope that maps a position of the beam spot at a plurality of z positions, as will be discussed in further detail below.

Figure 2A:
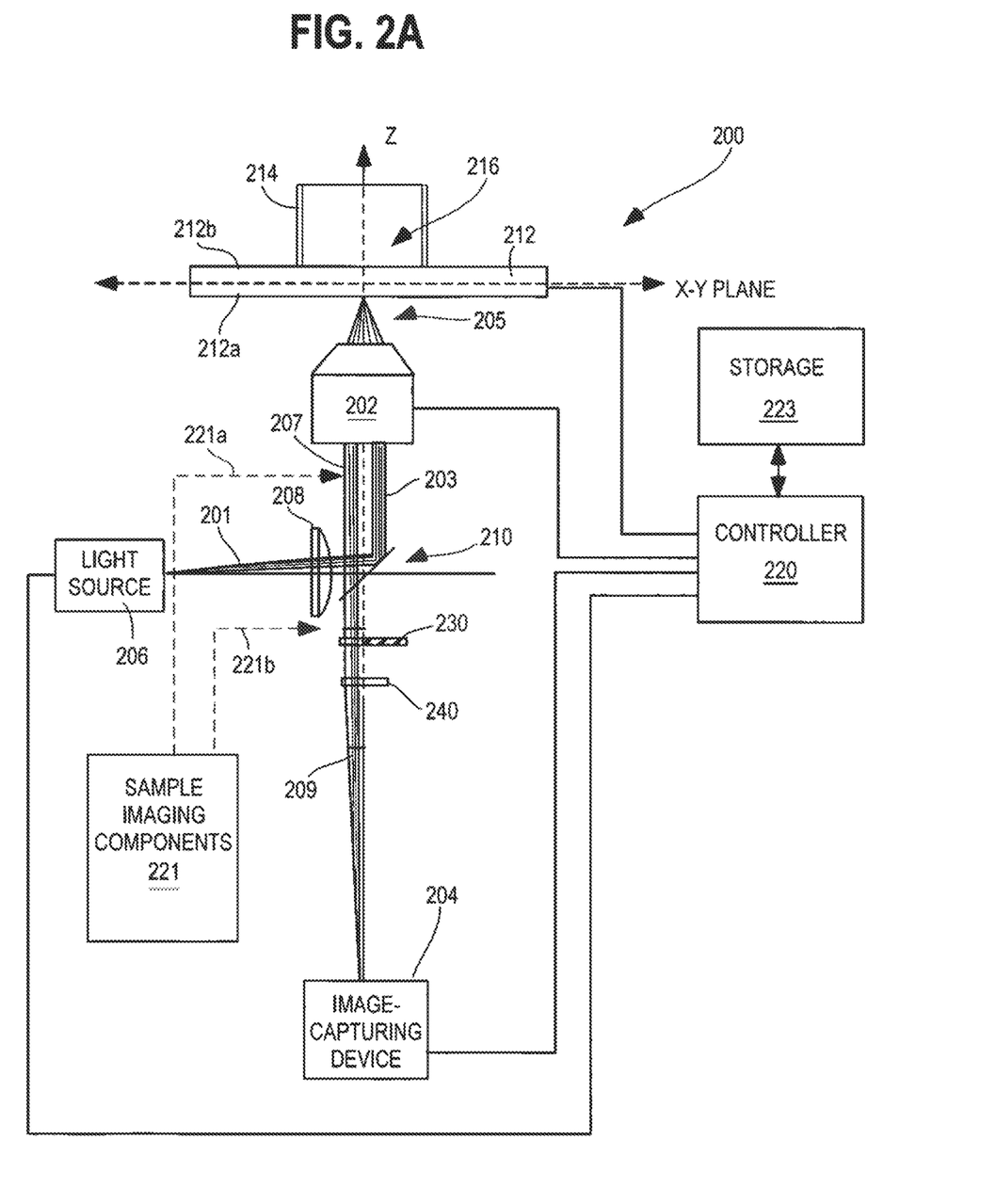
FIG. 2A is an example implementation of a system for calibrating a best focus position and autofocusing an objective lens in a microscope system.

FIG. 2A is an example implementation of an autofocus system 200 for calibrating a best focus position and auto-focusing an objective lens 202 for a microscope system. The autofocus system 200 includes an image-capturing device 204, a light source 206, a first imaging lens 208, a beam splitter 210, a second imaging lens 240, and an autofocusing aperture 230. The objective lens 202 is a component of the microscope system configured to perform imaging and/or optical measurements on samples that may be deposited into a sample well 214. Other components of the microscope system include any sample holding structure supporting the plate 212 with the reference surfaces 212a, 212b.

The autofocus system 200 in FIG. 2A is implemented as a module or a sub-system of the microscope system. Other components that the microscope system uses for imaging samples, such as for example, excitation light source, filters, beam splitters, and sample image capturing device, are represented in FIG. 2A as sample imaging components 221. The sample imaging components 221 may include lenses, filters, or other optical devices, for example, that form optical paths that include the objective lens 202 and the plate 212 when the microscope system is used to image samples. The microscope system 200 may also use a different light source or a different sample image-capturing device based on the type of imaging or measurement being performed. The optical devices may be inserted below the objective lens in FIG. 2A at 221a above the beam splitter 210, or at 221b above the decentered aperture 230. The sample well 214 in the example shown in FIG. 2A is formed on a plate 212, which provides a bottom reference surface 212a and a top reference surface 212b for the autofocus procedure.

Once a self-calibration of the best focus position is performed for a given objective lens 202, the process of focusing that objective lens 202 in subsequent imaging or optical measurements may be performed with minimal further imaging. The calibration of the best focus position may be stored as a reference calibration slope, which may be stored or included with data characterizing the objective lens 202 in a system data storage system 223.

The first imaging lens 208 collimates a light from the light source 206 along optical path 201 and passes the collimated light to the beam splitter 210. The beam splitter 210 reflects a portion of the light towards the objective lens 202 along optical path 203, and towards the plate 212 on optical path 205. The plate 212 reflects the light back to the objective lens 202 and towards the beam splitter 210 on optical path 207. The beam splitter 210 passes a portion of the light along optical path 209 towards the decentered aperture 230. The light passes through an off-centered opening on the aperture 230 that is smaller than the total light beam impinging on the aperture 230. The remaining portion of the aperture 230 occludes the part of the light beam that is not passed through the aperture. The light passing through the aperture 230 is directed to the second imaging lens 240 and to the image-capturing device 204. The decentered aperture 230 operates by sampling a portion of the planar wavefront from the objective lens 202. The sampled portion of light is focused by the second imaging lens 240 and directed towards the detector but constrained by the decentered aperture as an asymmetric marginal ray. This allows viewing the position of the light and best focus without changing any of the component setup. It should be appreciated that different decentered apertures having different sizes and/or positions may be used to allow for adjustment of sensitivity or for different sizes of the pupil diameter of the objective lens 202.

It is noted that the optical paths 201, 203, 205, 207, and 209 shown in FIG. 2A only show light along the optical paths that forms the light beam impinging on the image-capturing device 204. The portion of the light not shown is the portion of the light that is occluded by the occluding portion of the autofocusing aperture 230.

The objective lens 202 is configured to move along the optical paths 203 and 205 on a z-axis (shown in FIG. 2A), which is perpendicular to an x-y plane along which the plate 212 extends. The description below references positions of the objective lens as being on a z-axis, and positions of the reference images, or lateral positions, as being on an x-y plane as a way of providing clarity. The reference images translate along a linear path on the image plane. This linear path is referred to as the y-axis. It is to be understood that the use of the z-axis or the y-axis to provide a spatial reference is not intended to be limiting. Any suitable coordinate system may be used. It is further noted that example implementations may involve an objective lens 202 that travels in a non-vertical direction.

The plate 212 may include a sample well 214 as shown in FIG. 2A, which may be positioned for the imaging of a sample that may be deposited therein according to the normal functions and operation of the microscope system. In the example system shown in FIG. 2A, the plate 212 has a first surface 212a and a second surface 212b, which is the bottom surface of the sample well. The first surface 212a and/or the second surface 212b may be at least partially reflective and thereby provide a reflective reference surface to use during a self-calibrating autofocus procedure. The reference surface may also be provided on a cover slip, or on surfaces of a slide, or other planar material disposed in the optical path in proximity to the bottom surface of the sample well 214.

The objective lens 202 may be moved along the z-axis using a linearly actuating motor controlled by the controller 220. The objective lens 202 is represented schematically in FIG. 2A as including the linearly actuating motor that moves the objective lens 202. The objective lens 202 includes selected optics configured to focus light from the light source on the sample 216 when the microscope system 200 is controlled to image on a sample. During the autofocus procedure, the objective lens 202 is controlled to focus on the reference surface (212*a* or 212*b* on the plate 212). In some implementations, the motor that moves the objective lens 202 may be a stepper motor or a servomotor with a linear actuator.

The light along the optical path passing through the decentered aperture 230 travels through the second imaging lens 240 to the image capturing device 204 where a projected source is imaged on a detector plane. When defocused, the light beam on the image capturing device 204 is spread in size, has a lower intensity, and/or a low contrast. When the objective lens 202 is in focus, the reference image is captured at a maximum intensity, at a smallest size, and its highest contrast. The process of focusing the objective lens 202 involves moving the objective lens 202 to find the best focus position on the z-axis. Each beam spot in each reference image captured at each objective lens 202 z-position, appears on a position in the image plane that is offset from the spot position on the previous images.

In example implementations, the image capturing device 204 in the autofocusing system 200 may be a linear array detector, a charge-coupled device, a position sensitive diode, a 2-D sensor array as the image capturing device, or any suitable device that may be controlled by a controller 220 to capture images of a reference image as the objective lens 202 is controlled to move to a series of z-positions. The light source 206 in the autofocusing system 200 may be any suitable light emitting device, such as a laser, a light emitting diode (LED) or an LED array, an incandescent light, a fluorescent light source, infrared light or the like.

The controller 220 may be implemented using any computer-programmable system having a hardware interface connected to at least the image capturing device 204 and the motor configured to move the objective lens 202. In some implementations, the controller 220 may also be a component of the microscope system 221 for which the objective lens is being autofocused. The self-calibrating autofocusing procedure may be a function stored as software in the data storage medium 223 to which the controller 220 has access.

Figure 2B:
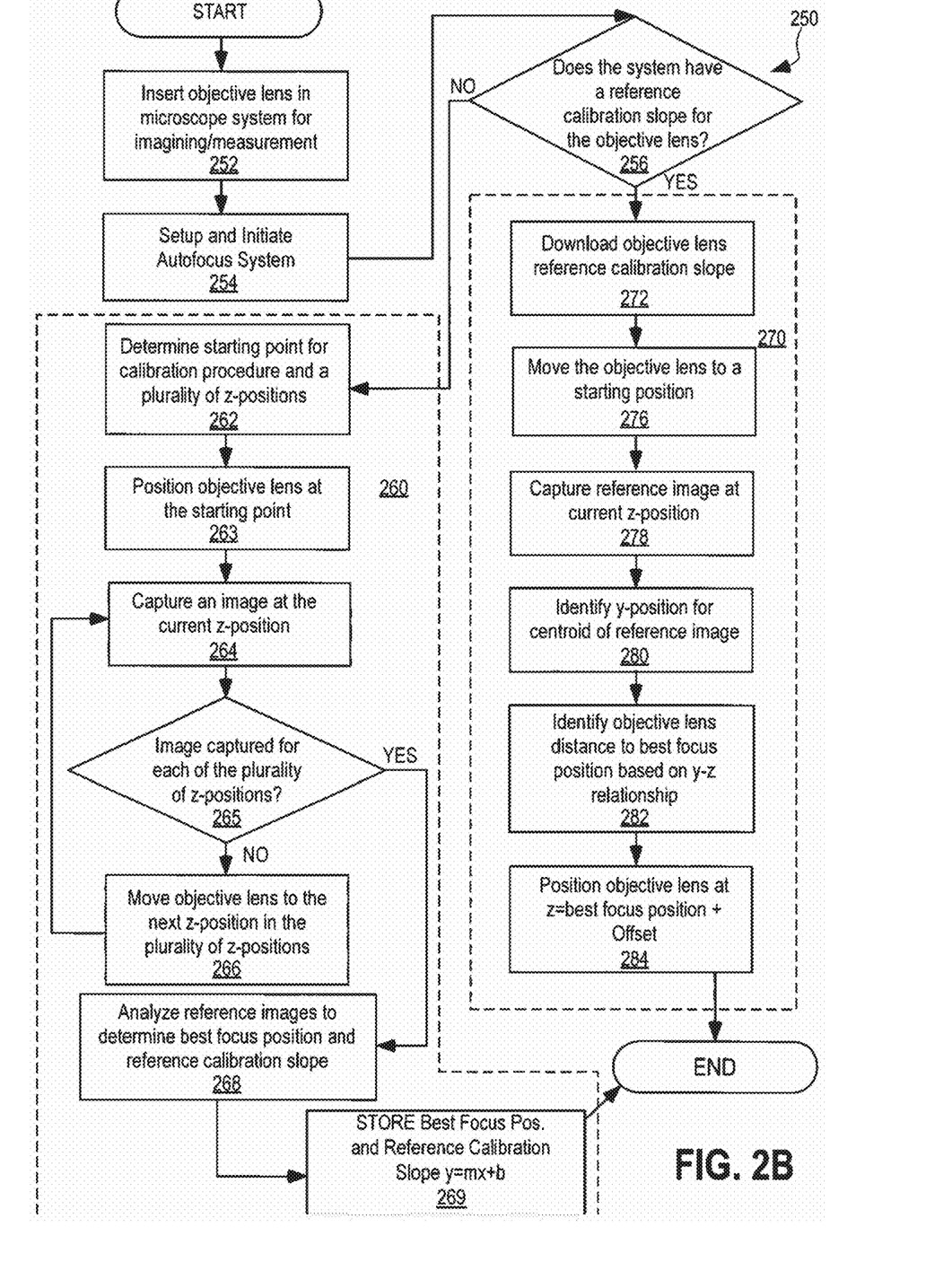
FIG. 2B is a flowchart illustrating operation of an example system for calibrating a best focus position and autofocusing an objective lens in a microscope system.

The self-calibration and autofocusing procedure for a given objective lens involves performing a first process of obtaining the reference calibration slope. The reference calibration slope may then be used to autofocus the objective lens thereafter. The flowchart in FIG. 2B illustrates operation of an example method 250 for autofocusing an objective lens by first obtaining a reference calibration slope at 260 and by using the reference calibration slope at 270 to determine the best focus position of the objective lens 202. The objective lens 202 may then be moved to focus on a sample using an offset from the best focus position, or other methods, such as performing a hardware-based focus similar to the hardware-based method described above with reference to FIG. 1A on the sample.

Referring to FIGS. 2A (for components referenced below) and 2B, a self-calibrating and autofocusing procedure may be initiated when an objective lens 202 is inserted for use in a microscope system 200 at step 252. At step 254, the system may perform initiation or setup functions for using the specific objective lens 202 that has been selected. One initiation step may include determining if a reference calibration slope has been generated for the objective lens 202 at decision block 256. If no reference calibration slope has been generated (indicated by the 'NO' path to method 260), a starting point location is determined for an autofocus procedure at step 262.

When an objective lens 202 has been inserted, or installed, in a microscope system, the position of the objective lens 202 along the z-axis is typically not known to the system. The system 200 may perform a home function that positions the objective lens 202 in a known position based on a home structure that may be sensed by the objective lens 202 or a sensor affixed to the structure of the objective lens 202 as it moves. In other implementations, the objective lens 202 may be positioned at its furthest location from the plate 212.

Once the objective lens 202 is in a known or home position, the controller 220 may position the objective lens 202, at step 263, a predetermined distance away from the home position in order to begin an autofocus procedure. The predetermined distance may be a starting position stored in a data description of the objective lens 202. The starting position may be a parameter that is used for all or most objective lenses.

At step 264, a reference image is captured at a current position of the objective lens 202. The objective lens 202 is then positioned at a series of z-positions to scan the reference surface as the objective lens is moved. The scan involves capturing a reference image at each z-position. The z-position is checked to determine if the scan is complete as shown in decision block 265. The example in FIG. 2B for the check used in decision block 265 determines if the scan is complete by checking if a reference image has been captured for each z-position in the scan. The scan may be performed with a set number of z-positions or until a limit of travel on the objective lens is reached. If the scan is not complete, the objective lens 202 is moved to the next z-position at step 266 (along the NO decision path). At step 264, a reference image is captured at the next z-position. If the scan is complete, the reference images captured at each z-position are analyzed (the YES path of decision block 265) at step 268.

Figure 3A:
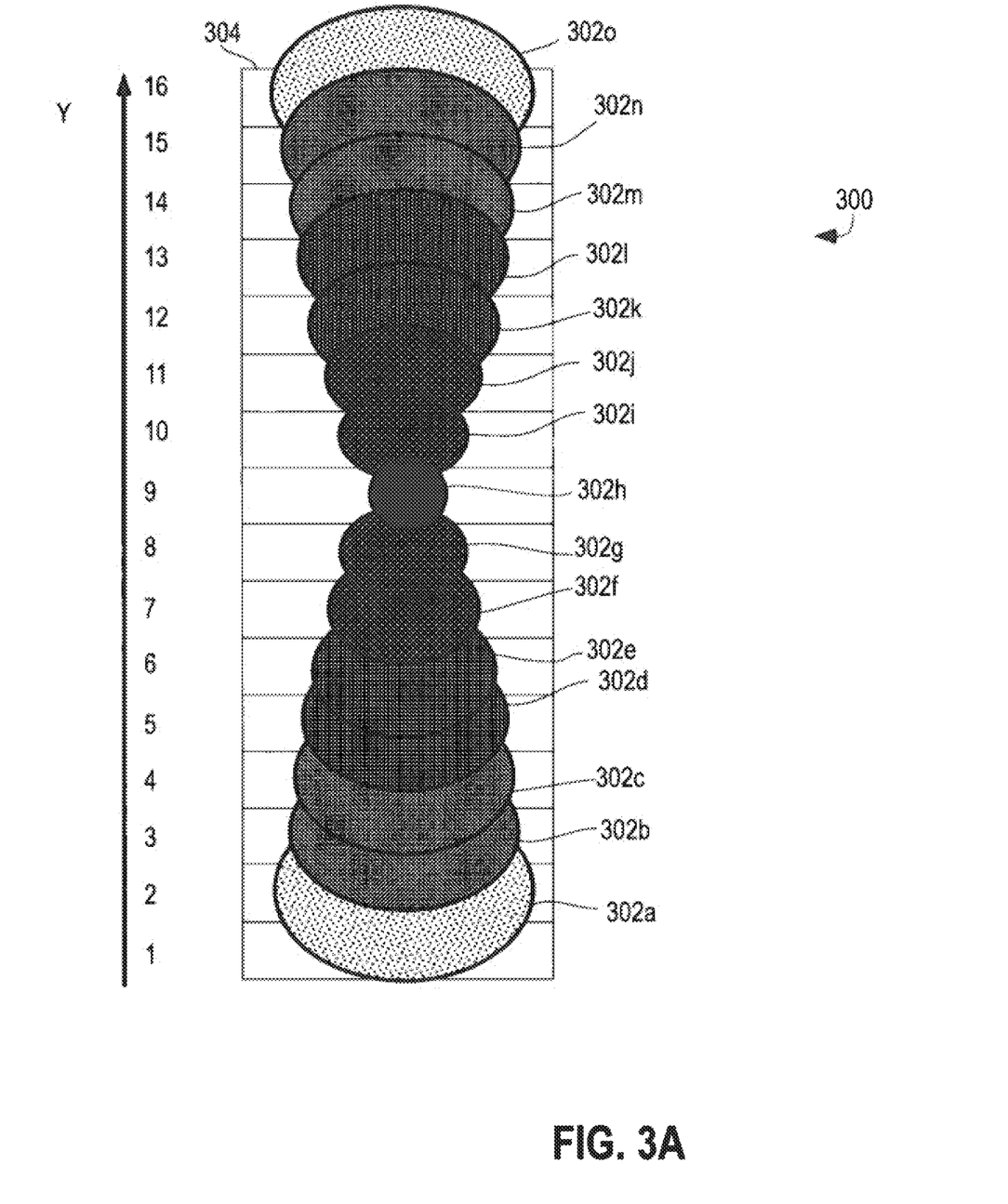
FIG. 3A is a schematic representation of an example of a plurality of images illustrating a lateral translation of a beam spot overlaid on a representation of a linear array detector during a calibration of a best focus position for an objective lens in a microscope system.

FIG. 3A is a schematic representation of an example of a plurality of images 300 illustrating a lateral translation (along a y-axis) of a beam spot 302*a-o* overlaid on a representation of a linear array detector 304 during a calibration of a best focus position for an objective lens in a microscope system.

The beam spots 302*a-o* in FIG. 3A are shown at 16 locations on the image plane of the linear array detector 304 for images captured at 16 corresponding z-positions of the objective lens 202 (FIG. 2A). It is noted that FIG. 3A shows 16 locations to illustrate the process, but at each time a single image plane is acquired per z-position. Although the illustrated embodiment shows 16 beam spots, it should be appreciated that any number of z positions and corresponding beam spots may be similarly used.

The beam spot 302 in each image is analyzed to determine the location of each beam spot. The determination of a centroid location for an imaged object is well known and need not be described in further detail. The y-axis location of the centroid of each beam spot 302 in each reference image is determined and associated with the z-position of the objective lens when each image was captured. FIG. 3A illustrates the lateral translation of the beam spot 302 as the reference images overlaid on one another. The beam spots 302 are located along the y-axis where the beam spots appear in the reference image in which each beam spot is captured.

Each beam spot 302*a-o* is shown in FIG. 3A as being unfocused at the initial y-axis locations, such as y=1 through y=6. The level of focus is determined from measuring attributes of the beam spots 302. The beam spots 302*a-e* for example have a lower intensity, which is indicated in the example in FIG. 3A by the lighter shade of each spot. At y=7, the beam spot 302*f* is more focused, which is determined by the smaller size and greater intensity of the beam spot image 302*f*. The greater intensity is indicated by the darkening shade of beam spot 302*f* Beam spot 302*h* is the darkest (highest light intensity) and smallest spot in FIG. 3A.

As the objective lens 202 is moved further along the series of z-positions in the scan past y=9, the beam spots 302*i*-302*o* become larger and have a lighter shade, which indicate the reference images are defocusing. Referring to FIG. 2B, the best focus position may be determined, as shown at step 268, by identifying the smallest and brightest beam spot, and setting the z-position at which that image was captured as the best focus position. In the example shown in FIG. 3A, the best focus position is the z-position corresponding to the y-position of beam spot 302*h*. As indicated above, other optical characteristics may be used to determine the best focus position besides intensity, and the example above should not be read as limiting. In addition, the determination of intensity for each beam spot 302 (in FIG. 3A) may be based on an average intensity of all pixels forming the spot, or other measures. In example implementations, the intensity or contrast may be used to determine a focus score for each spot.

At step 268, further analysis compares the y-positions of the beam spots (302*a-o* in FIG. 3A) to the z-positions to determine a linear relationship between y and z positions. The linear relationship may then be stored as the reference calibration slope at step 269.

Figure 3B:
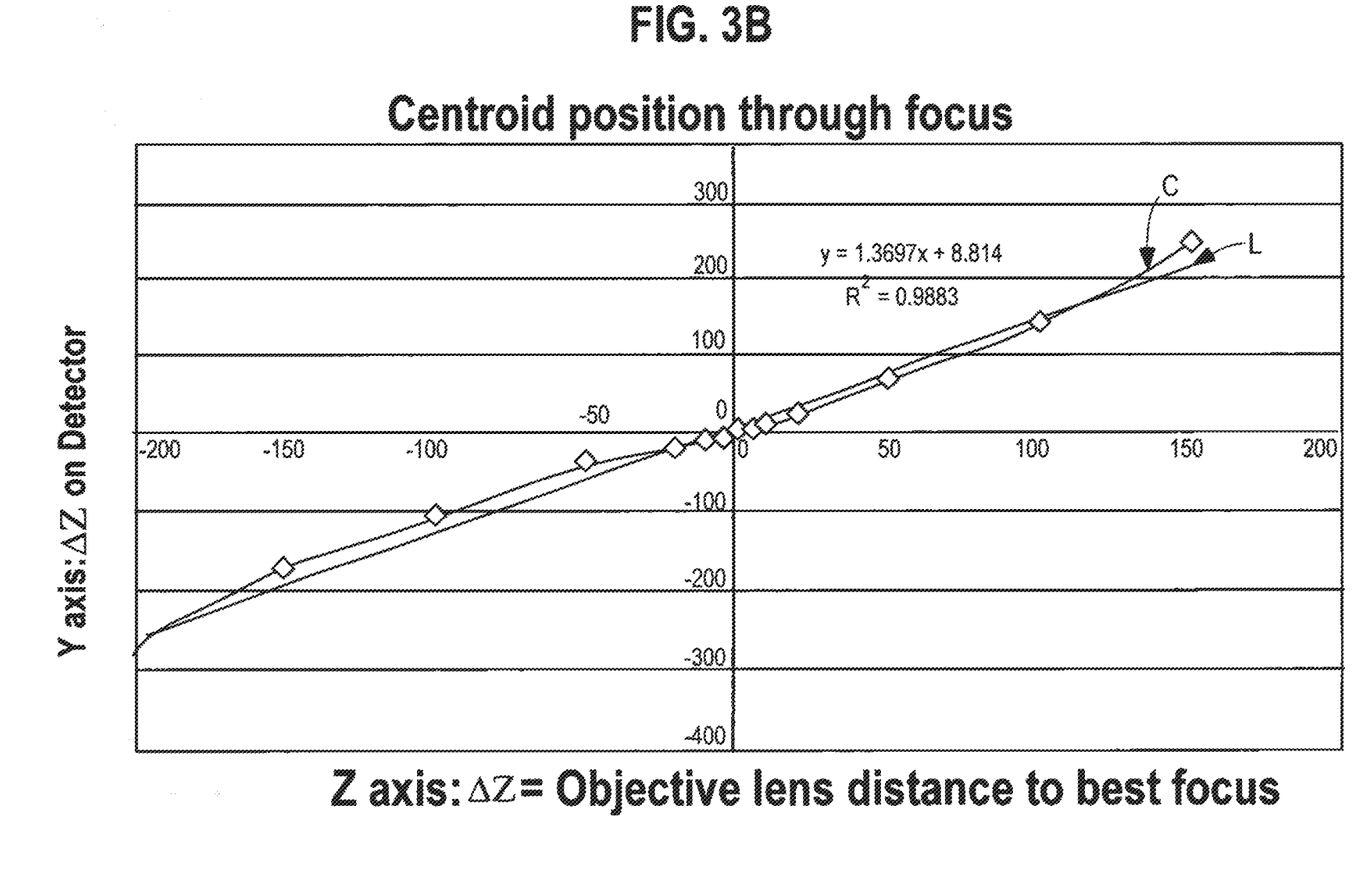
FIG. 3B is an example centroid plot of a laterally translating beam spot location on the detector during a scan of z-positions of the objective lens.

While a plot of the data is not necessary to store the reference calibration slope, FIG. 3B illustrates an example of a plot of reference image position y vs. z objective position relative to the plate 212*a*. For convenience, the y and x axis have been shifted relative to the best focus position at the origin. As shown in FIG. 3B, the y-z points identified from the scan described with reference to FIG. 3A may lie on a curve C that may be approximated by a line L. The reference calibration slope for the objective lens 202 may be indicated as being the linear expression for line L (i.e. y=mz+B), which in the illustrated example is y=1.37z+ 8.814. For the objective lens 202, a reference image, such as a beam spot 302, may be captured wherever the objective lens 202 is positioned. The position of the beam spot 302 on the y-axis may be determined. The current distance from the best focus position may then be determined using y=1.37z+ 8.814 and solving for z from one or more reference images within the linear range of the system The reference calibration slope preferably is a non-zero slope m. The reference calibration slope of m=0 would result if no decentered aperture or imaging lenses are used in the autofocus system. A flat horizontal line would not allow for a determination of the best focus position because the beam spot would be in the same position in every reference image regardless of the position of the objective lens. The reference calibration slope may be adjusted by selecting a decentered aperture according to aperture size and location of the light passing portion of the aperture. Imaging lenses may also be added to the autofocus system before or after the decentered aperture to adjust the magnitude of the reference calibration slope. It should also be noted that alignment of the sensor to the trajectory of the reference image position on the sensor may be easily set by orientation of the decentered aperture relative to the sensor.

Referring back to FIG. 2B at decision block 256, the objective lens inserted at step 252 may have already been calibrated for a best focus position. If so, a reference calibration slope is found for the objective lens 202 (the 'YES' decision path is followed) and method 270 is performed to obtain a focus. The reference calibration slope for the objective lens 202 is retrieved at step 272 and moved to a starting position at step 276. At step 278, an image is captured at the starting position. At step 280, the image is analyzed to determine a position of the centroid of the beam spot in the image on the y-axis. The y-position of the image is then used in the reference calibration slope to determine the current distance between the current position of the objective lens 202 and the best focus position at step 282.

The sample imaging components 221 (in FIG. 2A) of the microscope system may now be deployed to image a sample using the objective lens 202. The objective lens 202 may be moved to focus on the sample at step 284 by moving to the best focus position and a predetermined offset along the z-axis. The predetermined offset may be determined according to the type of sample being imaged, or the plate being used to hold the sample. In some implementations, the offset may depend on an objective, sample, or longitudinal color offset. The objective lens may also be controlled to move to a predetermined offset by shifting the target reference image away from best focus and scaling the shift by the calibration slope.

Some optical measurements may require higher sensitivity to defocus. As noted above, the objective lens may be focused on a sample using a hardware-based focus as described above with reference to FIGS. 1A and 1B but by starting from the best focus position determined using method 250 in FIG. 2B. Combining the profile method described with reference to FIGS. 1A and 1B with the predictive nature of the decentered aperture and calibration slope would improve the speed of the method by defining a smaller search range. The smaller search range may be based on one or more measurements predicting the appropriate objective positions while maximizing sensitivity to defocus.

Figure 4A:
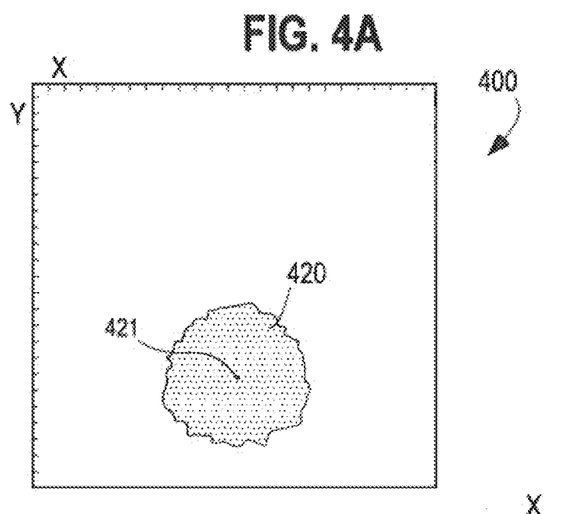
FIGS. 4A-4C are schematic representations of examples of images captured at different z-positions of the objective lens illustrating a process for autofocusing when a reference calibration slope is available for the objective lens.
Figure 4B:
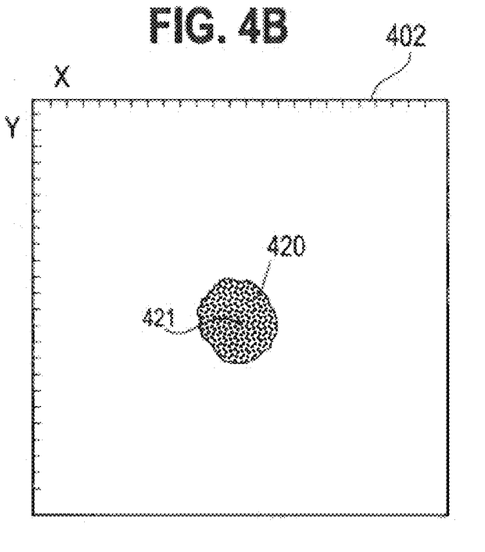
Figure 4C:
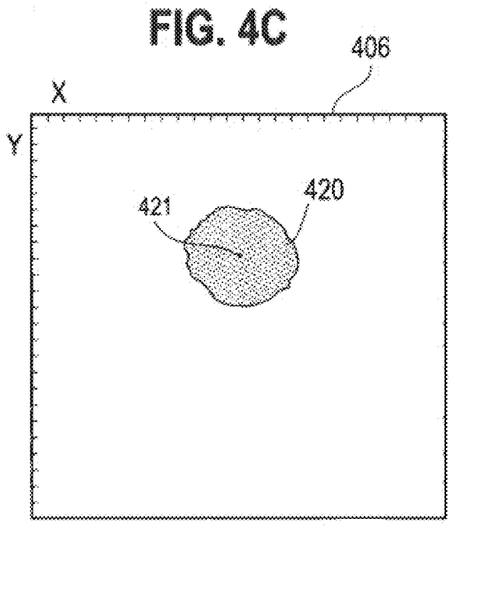

Referring back to FIG. 2B, if a more precise distance to the best focus position is needed, the objective lens may be moved to several different z-positions and steps 278-282 may be repeated for each z-position to which the objective lens 202 is moved. In this way, the linear relationship defining the reference calibration slope may be confirmed as well as finding best focus based the focus metric around best focus by fitting, interpolating, or other methods to improve resolution to defocus. This process is illustrated with reference to FIGS. 4A-4C. FIGS. 4A-4C show graphical representations of images 400, 402, 406 of beam spots 420 captured with the objective lens at different z-positions using an example of method 270 in FIG. 2B. Each spot 420 in FIGS. 4A-4C is shown with a centroid 421 as a smaller spot generally in a center of the spots. The image 402 in FIG. 4B shows the beam spot 420 at or near the best focus position. The image 400 in FIG. 4A shows the beam spot 420 in a y-position indicating the objective lens 202 is defocused in one direction away from best focus. The image 406 in FIG. 4C shows the beam spot 420 in a y-position indicating the objective lens 202 is defocused in the opposite direction of the beam spot 420 in FIG. 4A away from best focus. Images of three beam spots are shown in FIGS. 4A-4C for illustrative purposes. The three beam spots may actually represent a scan of a region of interest (ROI) that may be smaller than the image sensor, centered around the calibrated best focus, and clips the full dynamic range of the measurable defocus of the objective lens. In example implementations, many more images of beam spots may be captured and analyzed to improve resolution, particularly for smaller ROIs.

The beam spots 420 in FIGS. 4A-4C may be analyzed to determine a best focus position and a calibration slope based on the scan of the three beam spots. The best focus position may be found by interpolating, fitting, or picking the peak focus metric from the three beam spot scans and then compared with the original best focus position. The calibration slope found by analyzing the three beam spot scan may also be compared with the original reference calibration slope. The best focus positions and the reference calibration slopes should be within an acceptable error. If either is not within an acceptable error, the scan may be repeated with more data points, or with a larger ROI.

Figure 4D:
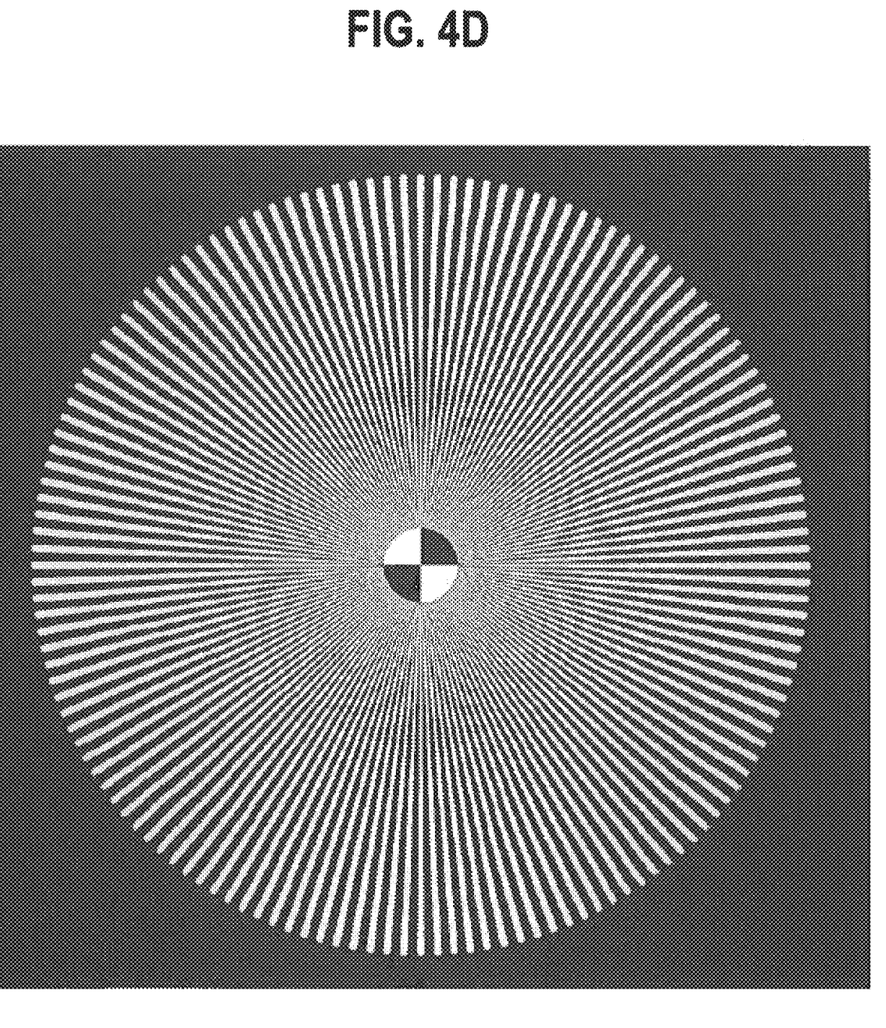
FIG. 4D is an example of a patterned image that may be projected on the image capturing device as a reference image.

It is noted that the reference image may be a beam spot or a patterned image. The light source 206 may be configured to generate a white light, or any other light of a suitable wavelength as a simple light beam or as a patterned image. FIG. 4D is an example of a patterned image that may be projected on the reference surface 212a or 212b and detected by the image capturing device as a reference image. If a patterned image is used, the best focus may be determined by analyzing the reference images using preferred data transformations, such as, for example, a Fourier transformation and then calculating the correlation. The patterned image may then be analyzed for optical attributes correspond to a best focus similar to the techniques described above for beam spots. The lateral position may be determined as either a centroid or a brightest pixel, and a highest contrast may be a preferred image attribute to determine best focus. The patterned image may also be analyzed using pattern recognition methods where a best pattern match to the original pattern indicates a best focus.

Figure 5:
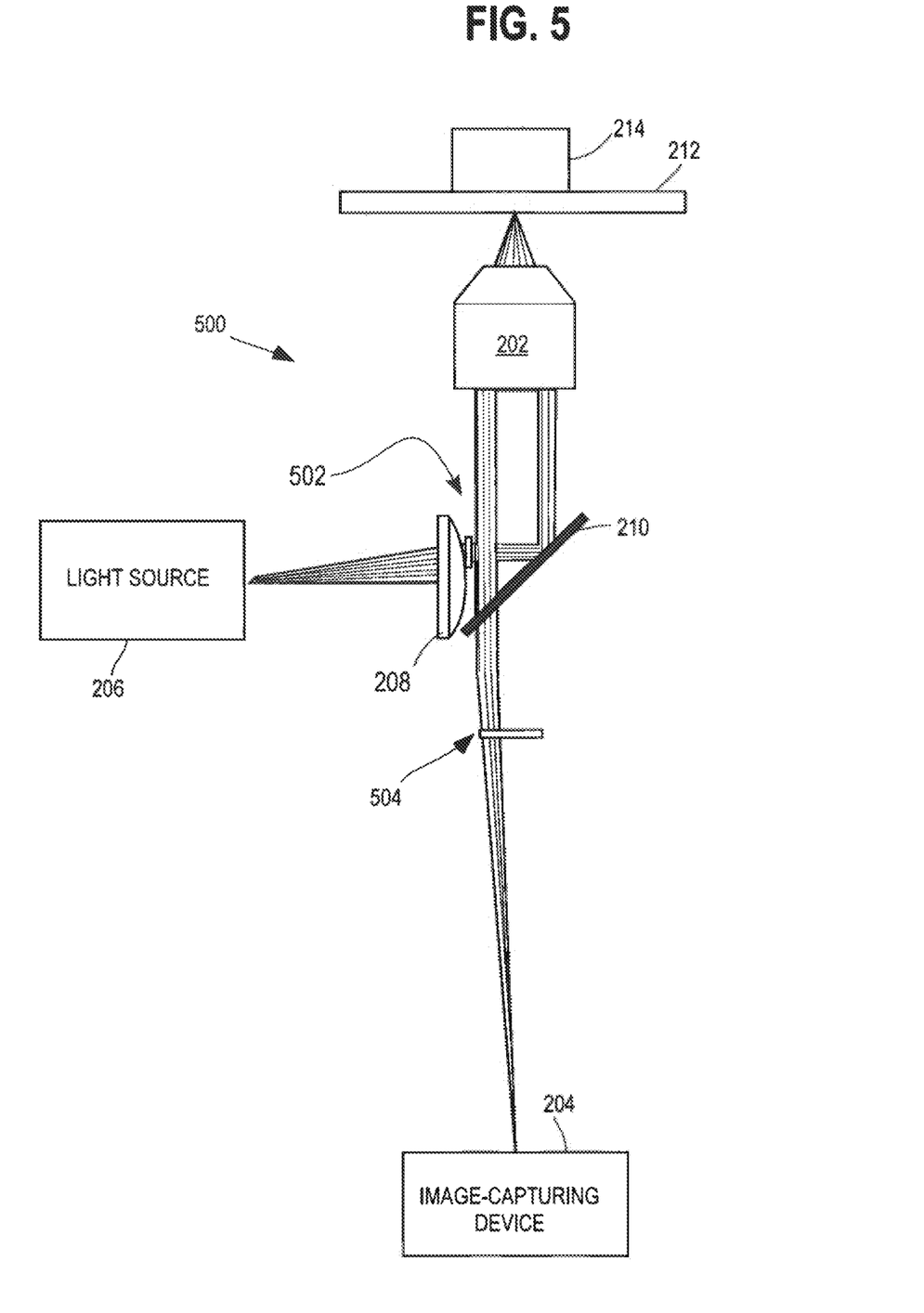
FIG. 5 is another example of a microscope system configured to perform self-calibrating autofocusing with the de-centered aperture 502 in the collimated illumination path.
Figure 6:
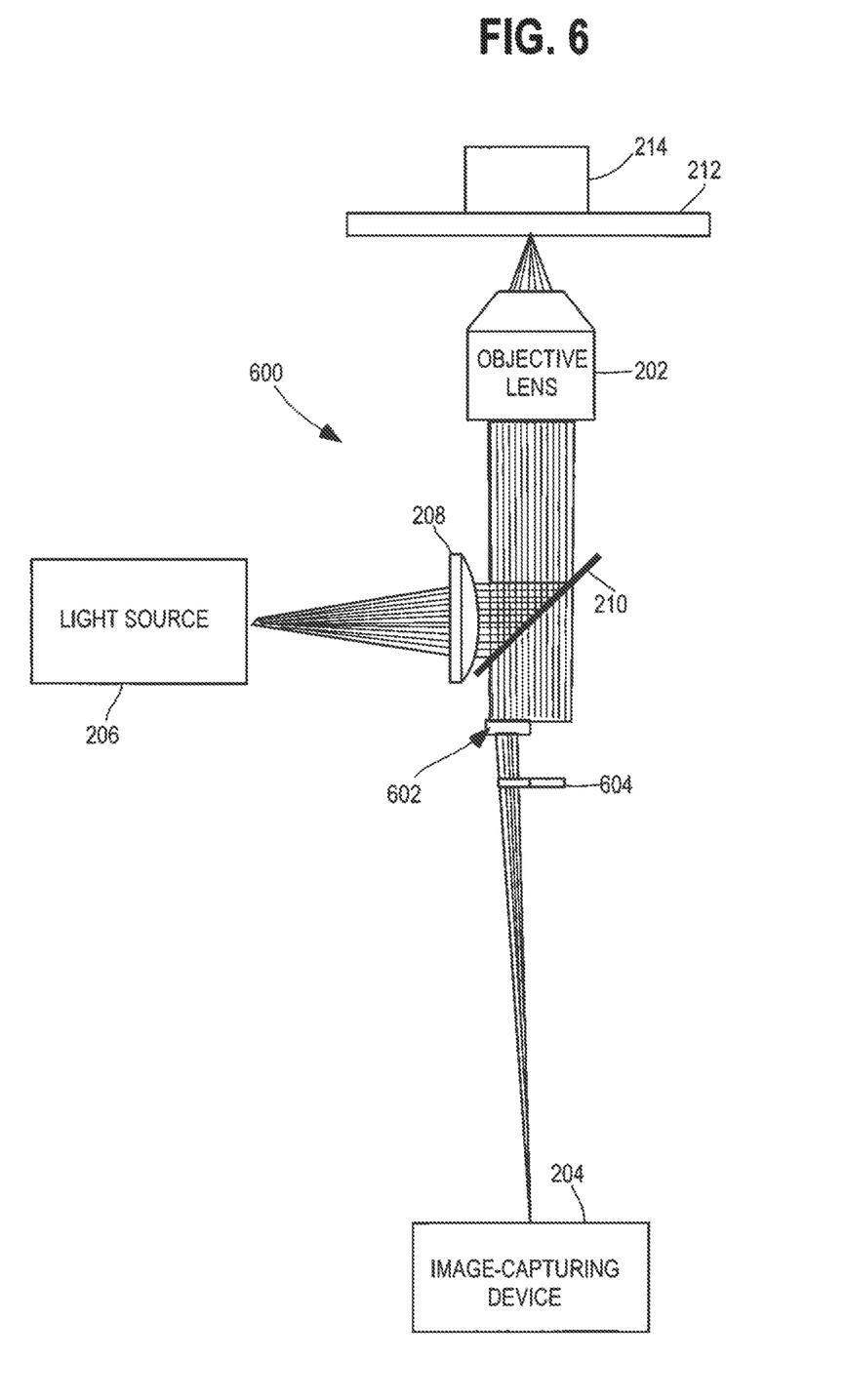
FIG. 6 is another example of a microscope system configured to perform self-calibrating autofocusing with the de-centered aperture 602 in collimated return emission path on the detector side.
Figure 7:
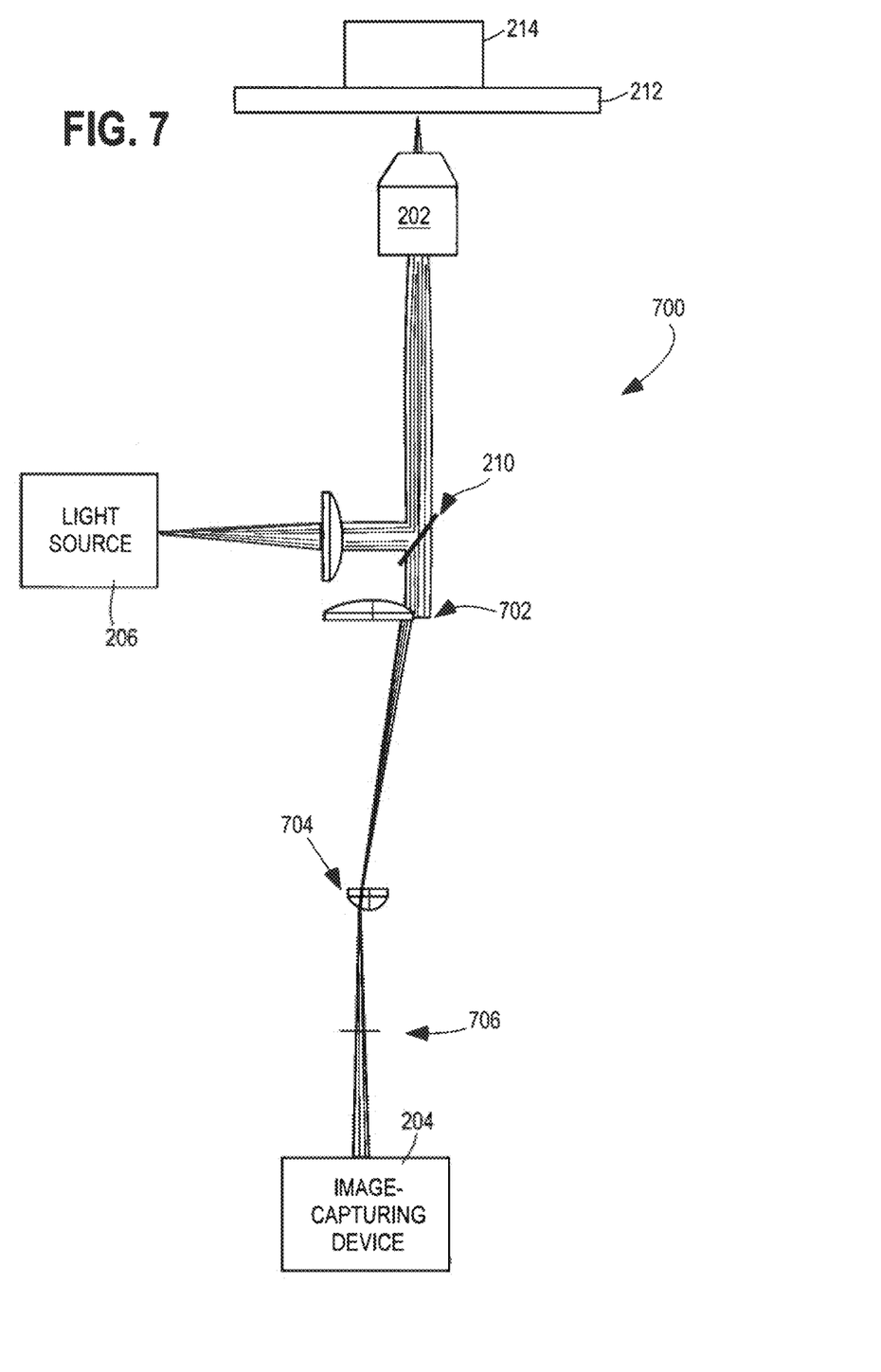
FIG. 7 is another example of a microscope system configured to perform self-calibrating autofocusing.

A self-calibrating autofocusing system may be implemented in a variety of configurations. FIGS. 5-7 are examples of alternative configurations. The configurations shown in FIGS. 5-7 depict the components of the autofocus system 200 in FIG. 2A with any added components labeled with different numbers. In addition, the controller 220 and the components for sample imaging 221 are also not shown.

FIG. 5 is an example of an autofocus system 500 configured to perform self-calibrating autofocusing in a microscope system (not shown) illustrating another location in which to position a decentered aperture 502. The decentered aperture 502 is disposed between the first imaging lens 208 and the beam splitter 210 as opposed to after the beam splitter 210. The optical paths shown in FIG. 5 are only the portion of total light passed through the decentered aperture 502.

FIG. 6 is another example of an autofocusing system 600 configured to perform self-calibrating autofocusing. The light source 206 and first imaging lens 208 may be configured to generate a light beam that fills an entrance pupil of the objective lens 202. Using a light beam that fills the entrance pupil of the objective lens 202 may reduce alignment errors and maximize sensitivity. The system 600 in FIG. 6 includes a decentered aperture 602 inserted above a second imaging lens 604 to control the direction and sensitivity of the beam translation. In an example implementation, the decentered aperture 602 is switchable (optically or mechanically in ways known to those of ordinary skill in the art) to provide a way of increasing light throughput and precision in finding the best focus position.

FIG. 7 is another example of an autofocus system 700 configured to perform self-calibrating autofocusing. The autofocus system 700 in FIG. 7 includes an off-axis imaging lens 702, and a beam magnifying lens 704 positioned above a decentered aperture 706.

The off-axis imaging lens 702 is positioned off-axis so that only a portion of the light beam passes the off-axis imaging lens 702. The light passing the off-axis imaging lens 702 is directed to the beam magnifying lens 704. The light then passes to the decentered aperture 706, which further emphasizes the lateral position of the beam.

It should be apparent to those who have skill in the art that any combination of hardware and/or software may be used to implement the autofocus system 200 described herein. It will be understood and appreciated that one or more of the processes, sub-processes, and process steps described in connection with FIGS. 2-7 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 2-7. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the microscope controller 220 in FIG. 2), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A method of autofocus for an objective lens in a microscope, comprising:
   disposing a decentered aperture in an optical path between the objective lens and an image capturing device;
   generating a reference calibration slope for the objective lens by determining respective positions of a plurality of images taken by the image capturing device at a series of z-positions of the objective lens, at least one image of the plurality of images having a particular attribute corresponding to a best focus position, wherein the optical path formed during capture of the plurality of images is at least partially occluded by the decentered aperture; and
   autofocusing the objective lens based at least in part on the reference calibration slope and the best focus position.

2. The method of claim 1 where: the plurality of images comprise a beam spot in each image formed by projecting a light reflected from a reference surface on an image capturing device.

3. The method of claim 1 where: the plurality of images comprise a pattern in each image formed by projecting a patterned light reflected from a reference surface on an image capturing device.

4. The method of claim 3 where: the particular attribute corresponding to the best focus position is a smallest pattern image size or optimal contrast.

5. The method of claim 3 where: the particular attribute corresponding to the best focus position is a highest pattern correlation with an original pattern using pattern recognition techniques.

6. The method of claim 1 where: the particular attribute corresponding to the best focus position is a highest contrast.

7. The method of claim 1 where: the particular attribute corresponding to the best focus position is a smallest beam spot size.

8. The method of claim 1 where: the particular attribute corresponding to the best focus position is a highest irradiance.

9. The method of claim 1 where: determining the position of the plurality of images comprises: determining a centroid location of each image along an axis of lateral translation.

10. The method of claim 1 where: generating the reference calibration slope includes determining a linear relationship between the centroid locations of the images and the corresponding z-positions.

11. The method of claim 9 further comprising: positioning a sample well in the optical path of the objective lens; and identifying a distance to move the objective lens to the best focus position for the sample well by: capturing a reference image, identifying the lateral position on the image plane of the reference image, and calculating, based on the lateral position of the reference image and the reference calibration slope, the distance to the best focus position.

12. The method of claim 1 further comprising: positioning the objective lens at the best focus position; determining an offset from the best focus position to a sample focus position; and positioning the objective lens at the best focus position plus the offset.

13. The method of claim 1 further comprising:
   moving the objective lens to the best focus position;
   capturing a sample image at each of a plurality of z-positions in a direction towards the sample;
   determining a focus score for each sample image at each corresponding z-position based on any one of, or a combination of focus metrics including spot diameter, intensity, average intensity, maximum signal measure, standard deviation, variance, and covariance;
   plotting the focus scores of each sample image for each z-position;
   identifying a highest peak in the final scores; and
   positioning the objective lens at the z-position corresponding to the highest peak.

14. A system for autofocusing an objective lens in a microscope system comprising:
   a light source;
   an image capturing device configured to capture images of a reflection of light from a reference surface while the objective lens is moved through a series of z-positions along a z-axis;
   a decentered aperture disposed in an optical path from the objective lens to the image capturing device, the decentered aperture is configured to occlude at least a portion of the light from the light source;

a controller configured to control the light source, the image capturing device, and the objective lens, the controller configured to perform a self-calibrating autofocusing process by:

generating a reference calibration slope for the objective lens by determining respective positions of a plurality of images taken at a series of z-positions of the objective lens, at least one image of the plurality of images having a particular attribute corresponding to a best focus position; and autofocusing the objective lens based at least in part on the reference calibration slope and the best focus position.

15. The system of claim 14 where: the light source is configured to project a beam spot on the image capturing device.

16. The system of claim 14 where: the light source is configured to project a pattern image on the image capturing device.

17. The system of claim 16 where: the particular attribute corresponding to the best focus is a smallest pattern image size or optimal contrast.

18. The system of claim 16 where: the particular attribute corresponding to the best focus position is a highest pattern correlation with an original pattern using pattern recognition techniques.

19. The system of claim 14 where: the particular attribute corresponding to the best focus position is a highest contrast.

20. The system of claim 14 where: the particular attribute corresponding to the best focus position is a smallest beam spot size.

21. The system of claim 14 where: the particular attribute corresponding to the best focus position is a highest irradiance.

* * * * *